US007224689B2

(12) United States Patent
Freeman

(10) Patent No.: US 7,224,689 B2
(45) Date of Patent: May 29, 2007

(54) METHOD AND APPARATUS FOR ROUTING OF MESSAGES IN A CYCLE-BASED SYSTEM

(75) Inventor: Jay R. Freeman, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1062 days.

(21) Appl. No.: 10/197,451

(22) Filed: Jul. 17, 2002

(65) Prior Publication Data

US 2003/0035375 A1    Feb. 20, 2003

Related U.S. Application Data

(60) Provisional application No. 60/313,735, filed on Aug. 20, 2001, provisional application No. 60/313,217, filed on Aug. 17, 2001.

(51) Int. Cl.
H04L 12/58 (2006.01)
(52) U.S. Cl. .................. 370/389; 370/428; 370/429; 703/14; 703/15; 703/16; 703/17; 703/19; 703/20; 703/27; 703/28; 716/6; 716/18; 717/104
(58) Field of Classification Search .............. 370/256, 370/351, 357, 389, 428, 429; 703/13, 14, 703/15, 16, 25, 17, 20, 27, 28; 709/224, 709/238, 245, 250; 712/11, 15, 227; 716/6, 716/12, 13, 14, 16, 17, 18
See application file for complete search history.

(56) References Cited

U.S. PATENT DOCUMENTS 4,916,647 A * 4/1990 Catlin ...................... 703/16

| 5,530,809 | A | * | 6/1996 | Douglas et al. | ............. 709/250 |
| 5,852,630 | A | * | 12/1998 | Langberg et al. | ........... 375/219 |
| 5,857,091 | A | * | 1/1999 | Fernandes et al. | ............ 703/21 |
| 5,964,837 | A | * | 10/1999 | Chao et al. | ................. 709/224 |
| 6,152,612 | A | * | 11/2000 | Liao et al. | .................... 703/23 |
| 6,263,483 | B1 | * | 7/2001 | Dupenloup | ................. 716/18 |
| 6,324,495 | B1 | * | 11/2001 | Steinman | ..................... 703/17 |
| 6,466,898 | B1 | * | 10/2002 | Chan | ........................... 703/17 |
| 6,856,950 | B1 | * | 2/2005 | Abts et al. | ..................... 703/13 |
| 6,922,665 | B1 | * | 7/2005 | Guccione et al. | ............. 703/14 |
| 6,957,423 | B1 | * | 10/2005 | Ma | ............................. 717/137 |
| 6,961,689 | B1 | * | 11/2005 | Greenberg | .................... 703/17 |
| 7,035,781 | B1 | * | 4/2006 | Flake et al. | ................... 703/14 |

(Continued)

OTHER PUBLICATIONS

Fujimoto, "Parallel Discrete Event Simulation", Dec. 1989, ACM Press, Proceedings of the 21st Conference on Winter simulation WSC '89, p. 19-28.*

(Continued)

*Primary Examiner*—Hassan Kizou
*Assistant Examiner*—Brian T. O'Connor
(74) *Attorney, Agent, or Firm*—Osha Liang LLP

(57) ABSTRACT

A method for routing a message from a source node to a destination node, where the source node and the destination node are connected by a plurality of nodes in a cycle-based system, is disclosed. The method includes generating a maze data structure including the plurality of nodes, where each of the plurality of nodes is associated with a dimension corresponding to time, and routing the message from the source node to the destination node using the dimension corresponding to time.

47 Claims, 8 Drawing Sheets

U.S. PATENT DOCUMENTS 7,076,416 B2 * 7/2006 Chen et al. ............... 703/15
7,080,365 B2 * 7/2006 Broughton et al. ......... 717/146
2002/0152060 A1 * 10/2002 Tseng ..................... 703/17

OTHER PUBLICATIONS

Rajagopol et al, "Parallel simulation: practice: contrasting distributed simulation with parallel replication: a case study of a queuing simulation on a network of transputers", Dec. 1989, ACM Press, Proceedings of the 21st conference on Winter simulation, p. 746-755.*

Som et al, "On analyzing Events to estimate the possible speedup of parallel discrete event simulation", Dec. 1989, ACM Press, Proceedings of the 21st conference on Winter simulation, p. 729-737.*

* cited by examiner

METHOD AND APPARATUS FOR ROUTING OF MESSAGES IN A CYCLE-BASED SYSTEM

CROSS-REFERENCE TO RELATED APPLICATIONS

This application claims benefit of U.S. Provisional Application Ser. No. 60/313,735, filed Aug. 20, 2001, entitled "System Related Inventions," in the names of Thomas M. McWilliams, Jeffrey B. Rubin, Michael Parkin, Oyenkunle Olukotun, Derek Pappas, Jeffrey Broughton, David R. Emberson, Ashley Saulsbury, Earl T. Cohen, William Lam, Liang T. Chen, Ihao Chen, Jay Reynolds, Ankur Narang, David Chenevert, Nyles Nettleton, Tom Riddle, Jim Burr, and David Allison.

This application claims benefit to Provisional Application Ser. No. 60/313,217, filed Aug. 17, 2001, entitled "Phaser System Architecture," and invented by Thomas M. McWilliams, Jeffrey B. Rubin, Derek Pappas, Kunle Olukotun, Jeffrey Broughton, David R. Emberson, William Lam, Liang T. Chen, Ihao Chen, Earl T. Cohen, and Michael Parkin.

BACKGROUND OF INVENTION

Modern high performance microprocessors have an ever-increasing number of circuit elements and an ever-rising clock frequency. Also, as the number of circuits that can be used in a CPU has increased, the number of parallel operations has risen. Examples of efforts to create more parallel operations include increased pipeline depth and an increase in the number of functional units in super-scalar and very-long-instruction-word architectures. As CPU performance continues to increase, the result has been a larger number of circuits switching at faster rates.

As each new CPU design uses more circuit elements, each often operating at increased frequencies, the time required to simulate the design increases. Due to the increased time for simulation, the number of tests, and consequently the test coverage, decreases. In general, the result has been a dramatic increase in the logic errors that escape detection before the CPU is manufactured.

After a CPU prototype is initially manufactured and failure modes are uncovered, the time required to determine failure mechanisms is generally increasing due to the increased CPU complexity. Failure modes may be the result of logic errors or poor manufacturability of a circuit element. In both cases, circuit simulation helps to confirm or refute the existence of a logic error. If a logic error does not exist, the manufacturability of a circuit element may be the root cause. Even after a logic error failure mechanism is discovered and a solution is proposed, the time required to satisfactorily determine that the proposed solution fixes the logic error and does not generate any new logic errors has increased. Circuit simulation is key to the design and debugging of increasingly complex and faster CPUs.

CPU simulation may occur at a "switch-level." Switch-level simulations typically include active circuit elements (e.g., transistors) and passive circuit elements (e.g., resistors, capacitors, and inductors). A typical switch-level circuit simulator is "SPICE," which is an acronym for Simulation Program with Integrated Circuit Emphasis. SPICE typically models each element using an equation or lookup table. SPICE can model accurately the voltage and/or current of each circuit element across time.

CPU simulation also may occur at a "behavioral level." Behavioral level simulations typically use a hardware description language (HDL) that determines the functionality of a single circuit element or group of circuit elements. A typical behavioral level simulation language is "Verilog," which is an Institute of Electrical and Electronics Engineers standard. Verilog HDL uses a high-level programming language to describe the relationship between the input and output of one or more circuit elements. The Verilog HDL describes on what conditions the outputs should be modified and what effect the inputs have. Verilog HDL programs may also be used for logic simulation at the "register transfer level" (RTL).

Using the Verilog HDL, for example, digital systems are described as a set of modules. Each module has a port interface, which defines the inputs and outputs for the module. The interface describes how the given module connects to other modules. Modules can represent elements of hardware ranging from simple gates to complete systems. Each module can be described as an interconnection of sub-modules, as a list of terminal elements, or a mixture of both. Terminal elements within a module can be described behaviorally, using traditional procedural programming language constructs such as "if" statements and assignments, and/or structurally as Verilog primitives. Verilog primitives include, for example, truth tables, Boolean gates, logic equation, and pass transistors (switches).

HDL languages such as Verilog are designed for efficient representation of hardware designs. Verilog has support for handling signals of arbitrary widths, not only for defining and using an arbitrary width signal, but for treating any sub-field of such a signal as a signal in its own right.

Cycle-based logic simulation is applicable to synchronous digital systems and may be used to verify the functional correctness of a digital design. Cycle-based simulators use algorithms that eliminate unnecessary calculations to achieve improved performance in verifying system functionality. Typically, in a cycle-based logic simulator the entire system is evaluated once at the end of each clock cycle. Discrete component evaluations and re-evaluations are typically unnecessary upon the occurrence of every event.

HDL simulations may be event-driven or cycle-based. Event-driven simulations propagate a change in state from one set of circuit elements to another. Event-driven simulators may record relative timing information of the change in state so that timing and functional correctness may be verified. Cycle-based HDL simulations also simulate a change in state from one set of circuit elements to another. Cycle-based HDL simulations, however, evaluate the state of the system once at the end of each clock cycle. While specific intra-cycle timing information is not available, simulation speed is improved.

HDL simulations may be executed on reconfigurable hardware, such as a field programmable gate array (FPGA) chip. The FPGA allows dedicated hardware to be configured to match the HDL code. FPGA hardware provides a method to improve the simulation time. As the design changes, the time required to reconfigure the FPGA arrangement may prohibit many iterations. Also, the number of FPGA chips required for complex designs may be relatively large.

HDL simulations also may be executed on general purpose processors. General purpose processors, including parallel general purpose processors, are not designed specifically for HDL simulations. HDL simulations require a large number of operations of inputs and outputs that use bit-wise operations.

Large logic simulations are frequently executed on parallel or massively parallel computing systems. For example, parallel computing systems may be specifically designed parallel processing systems or a collection, or "farm," of connected general purpose processing systems. FIG. 1 shows a block diagram of a typical parallel computing system (100) used to simulate an HDL logic design. Multiple processor arrays (112, 113, 129) are available to simulate the HDL logic design. A host computer (116), with associated data store (117), controls a simulation of the logic design that executes on one or more of the processor arrays (112, 113, 129) through an interconnect switch (118). The processor arrays (112, 113, 129) may be a collection of processing elements or multiple general purpose processors. The interconnect switch (118) may be a specifically designed interconnect or a general purpose communication system, for example, an Ethernet network.

A general purpose computer (120) with a human interface (122), such as a GUI or a command line interface, together with the host computer (116) support common functions of a simulation environment. These functions typically include an interactive display, modification of the simulation state, setting of execution breakpoints based on simulation times and states, use of test vectors files and trace files, use of HDL modules that execute on the host computer and are called from the processor arrays, check pointing and restoration of running simulations, the generation of value change dump files compatible with waveform analysis tools, and single execution of a clock cycle.

SUMMARY OF INVENTION

In general, in one aspect, the invention relates to a method for routing a message from a source node to a destination node, wherein the source node and the destination node are connected by a plurality of nodes in a cycle-based system, comprising generating a maze data structure comprising the plurality of nodes, wherein each of the plurality of nodes is associated with a dimension corresponding to time, and routing the message from the source node to the destination node using the dimension corresponding to time.

In general, in one aspect, the invention relates to a method for routing a message from a source node to a destination node, wherein the source node and the destination node are connected by a plurality of nodes in a cycle-based system, comprising obtaining a neighbor list for a current node if routing the message can proceed from the current node, wherein the current node is one of the plurality of nodes, analyzing the neighbor list to obtain a prioritized list, determining whether the message can move to a highest priority unevaluated node on the prioritized list, wherein determining whether the message can move uses the dimension corresponding to time associated with the current node and the dimension corresponding to time associated with the highest priority unevaluated node, and saving static routing information if the current node is the destination node.

In general, in one aspect, the invention relates to a method for routing a message from a source node to a plurality of destination nodes, wherein the source node and each of the plurality of destination nodes are connected by a plurality of nodes in a cycle-based system, comprising prioritizing each of the plurality of destination nodes to create a priority list, wherein prioritizing comprises sorting each of the plurality of destination nodes according to distance from the source node, and routing the message to each of the plurality of destination nodes using the priority list, wherein routing comprises obtaining a neighbor list for a current node if routing the message can proceed from the current node, wherein the current node is one of the plurality of nodes, analyzing the neighbor list to obtain a prioritized list, determining whether the message can move to a highest priority unevaluated node on the prioritized list, wherein determining whether the message can move uses the dimension corresponding to time associated with the current node and the dimension corresponding to time associated with the highest priority unevaluated node, and saving static routing information, if the current node is the destination node.

In general, in one aspect, the invention relates to a computer-readable medium having recorded thereon instructions executable by a processor, the instructions for routing a message from a source node to a destination node, wherein the source node and the destination node are connected by a plurality of nodes in a cycle-based system, the instructions comprising instructions for obtaining a neighbor list for a current node if routing the message can proceed from the current node, wherein the current node is one of the plurality of nodes, instructions for analyzing the neighbor list to obtain a prioritized list, instructions for determining whether the message can move to a highest priority unevaluated node on the prioritized list; wherein determining whether the message can move uses the dimension corresponding to time associated with the current node and the dimension corresponding to time associated with the highest priority unevaluated node, and instructions for saving static routing information, if the current node is the destination node.

In general, in one aspect, the invention relates to a computer-readable medium having recorded thereon instructions executable by a processor, the instructions for routing a message from a source node to a plurality of destination nodes, wherein the source node and each of the plurality of destination nodes are connected by a plurality of nodes, the instructions comprising instructions for prioritizing each of the plurality of destination nodes to create a priority list, wherein prioritizing comprises sorting each of the plurality of destination nodes according to distance from the source node, and instructions for routing the message to each of the plurality of destination nodes using the priority list, wherein routing comprises, obtaining a neighbor list for a current node if routing the message can proceed from the current node, wherein the current node is one of the plurality of nodes, analyzing the neighbor list to obtain a prioritized list, determining whether the message can move to a highest priority unevaluated node on the prioritized list, wherein determining whether the message can move uses the dimension corresponding to time associated with the current node and the dimension corresponding to time associated with the highest priority unevaluated node, and saving static routing information, if the current node is the destination node.

In general, in one aspect, the invention relates to a cycle-based system, comprising a plurality of node, an execution processor for generating a message to route, and a router for routing the message from a source node to a destination node, wherein the source node and the destination node are connected by the plurality of nodes, wherein the routing of the message comprises instructions for obtaining a neighbor list for a current node if routing the message can proceed from the current node, wherein the current node is one of the plurality of nodes, analyzing the neighbor list to obtain a prioritized list, determining whether the message can move to a highest priority unevaluated node on the prioritized list, wherein determining whether the message can move uses the dimension corresponding to time associated with the current node and the dimension corresponding to time associated with the highest priority unevaluated node, and saving static routing information, if the current node is the destination node.

In general, in one aspect, the invention relates to an apparatus for routing a message from a source node to a destination node, wherein the source node and the destination node are connected by a plurality of nodes in a cycle-based system, comprising means for generating a maze data structure comprising the plurality of nodes, wherein each of the plurality of nodes is associated with a dimension corresponding to time, and means for routing the message from the source node to the destination node using the dimension corresponding to time.

In general, in one aspect, the invention relates to an apparatus for routing a message from a source node to a destination node, wherein the source node and the destination node are connected by a plurality of nodes in a cycle-based system, comprising means for obtaining a neighbor list for a current node if routing the message can proceed from the current node, wherein the current node is one of the plurality of nodes, means for analyzing the neighbor list to obtain a prioritized list, means for determining whether the message can move to a highest priority unevaluated node on the prioritized list, wherein determining whether the message can move uses the dimension corresponding to time associated with the current node and the dimension corresponding to time associated with the highest priority unevaluated node, and means for saving static routing information, if the current node is the destination node.

Other aspects and advantages of the invention will be apparent from the following description and the appended claims.

DETAILED DESCRIPTION

Figure 1:
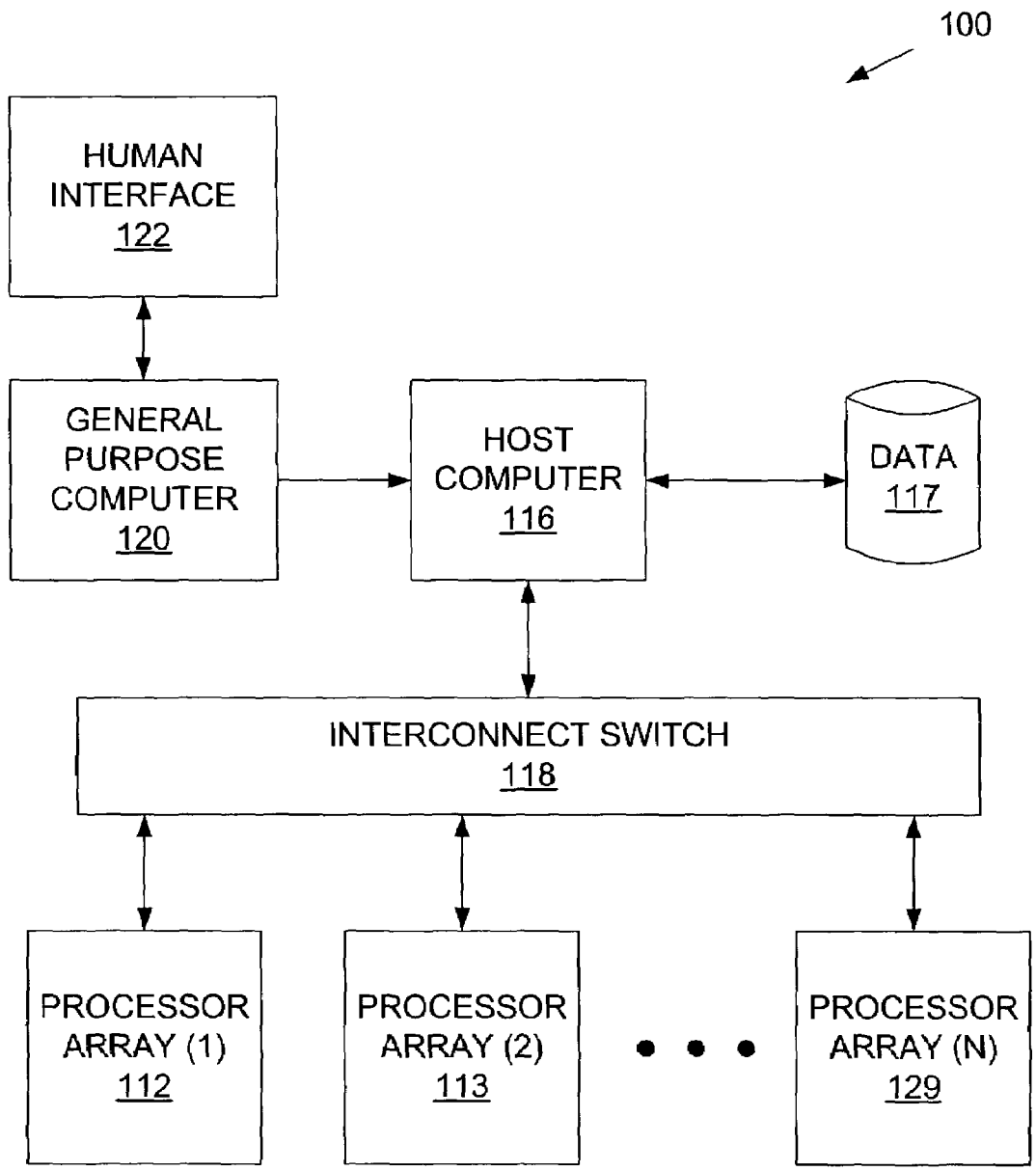
FIG. 1 shows a typical parallel computer system.

Specific embodiments of the present invention will now be described in detail with reference to the accompanying figures. Like elements in the various figures are denoted by like reference numerals for consistency.

The present invention is a method and apparatus for routing of messages in a cycle-based system, e.g., a cycle-based simulation system. In the following detailed description of the present invention, numerous specific details are set forth in order to provide a more thorough understanding of the present invention. However, it will be apparent to one of ordinary skill in the art that the present invention may be practiced without these specific details. In other instances, well-known features have not been described in detail to avoid obscuring the present invention.

Before describing in further detail cycle-based computation in a simulation system, a computer execution environment and a class of simulation systems (e.g., multiple instruction, multiple data (MIMD)) used with one or more embodiments of the present invention is described below.

In an embodiment of the present invention, the computer execution environment may use execution processors to execute execution processor code on a general purpose computer, such as a SPARC™ workstation produced by Sun Microsystems, Inc., or specialized hardware for performing cycle-based computations, e.g. a Phaser system.

The system of the present invention is a massively parallel, cycle-based computing system. The system uses an array of execution processors arranged to perform cycle-based computations. One example of cycle-based computation is simulation of a cycle-based design written in a computer readable language, such as HDL (e.g., Veilog, etc.), or a high-level language (e.g., Occam, Modula, C, etc.).

Figure 2:
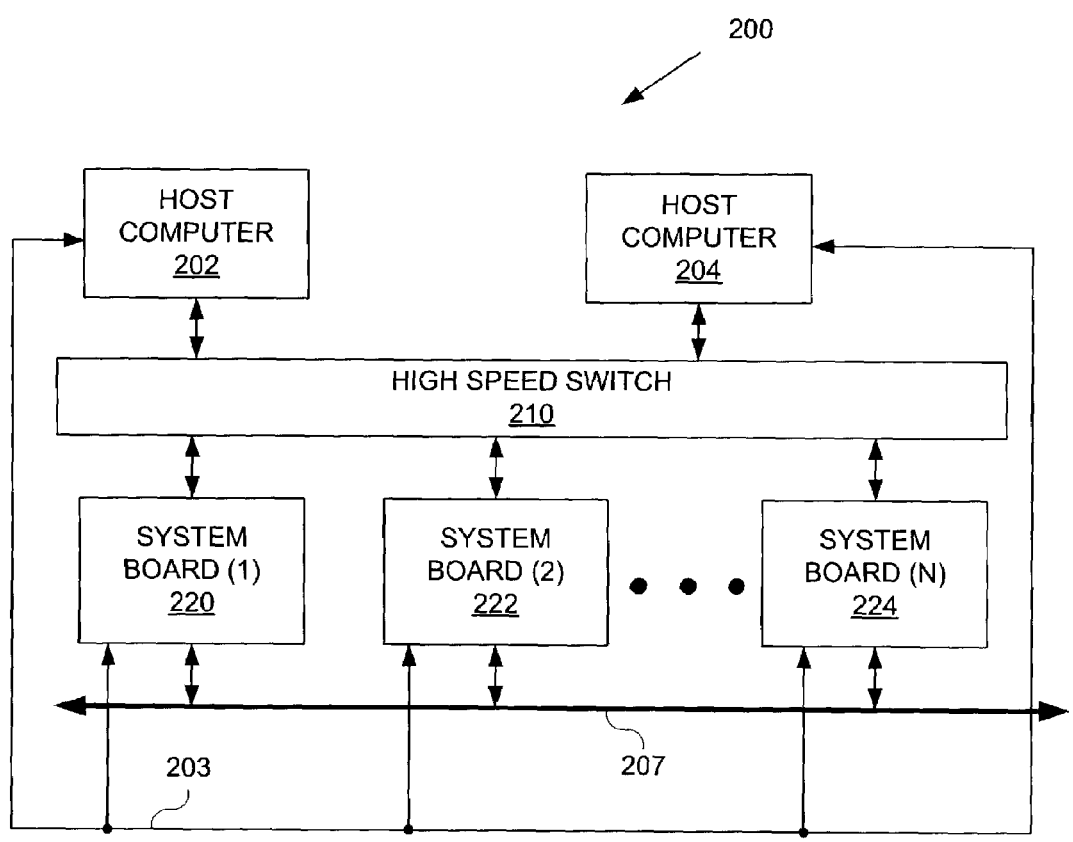
FIG. 2 shows a parallel computer system in accordance with an embodiment of the present invention.

FIG. 2 shows exemplary elements of a system (200), in accordance with one or more embodiments of the present invention. Cycle-based computation, such as a logic simulation on the system (200), involves one or more host computers (202, 204) managing the logic simulation(s) executing on one or more system boards (220, 222, 224). Each system board contains one or more Application Specific Integrated Circuits (ASIC). Each ASIC contains multiple execution processors. The host computers (202, 204) may communicate with the system boards (220, 222, 224) using one of several pathways. The host computers (202, 204) include interface hardware and software as needed to manage a logic simulation. A high speed switch (210) connects the host computers (202, 204) to the system boards (220, 222, 224). The high speed switch (210) is used for loading and retrieval of state information from the execution processors located on ASICs on each of the system boards (220, 222, 224). The connection between the host computers (202, 204) and system boards (220, 222, 224) also includes an Ethernet connection (203). The Ethernet connection (203) is used for service functions, such as loading a program and debugging. The system also includes a backplane (207). The backplane (207) allows the ASICs on one system board to communicate with the ASICs of another system board (220, 222, 224) without having to communicate with an embedded controller located on each system board. Additional system boards may be added to the system by connecting more system boards to the backplane (207).

Figure 3:
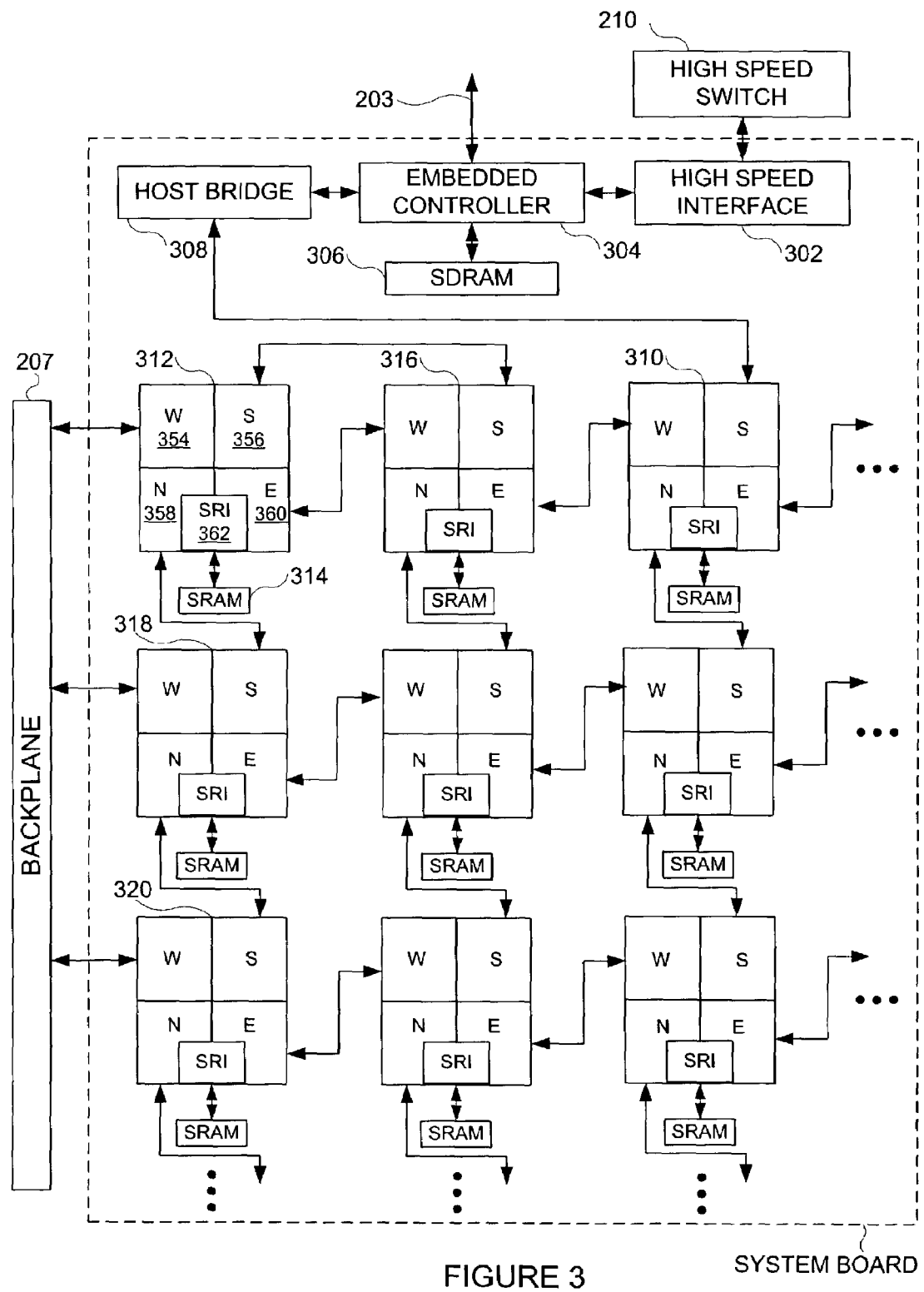
FIG. 3 shows a system board block diagram in accordance with an embodiment of the present invention.

FIG. 3 shows a block diagram of a system board in accordance with one or more embodiments of the present invention. The system board is representative of any of the system boards (e.g., system board (220, 222, 224)) shown in FIG. 2. The system board may include multiple ASICs. Each ASIC is connected via a two-dimensional mesh. Each ASIC has four input/output buffers referenced as North (N), South (S), East (E), and West (W). For example, an ASIC (312) has four input/output buffers N (358), S (356), E (360), and W (354). Each ASIC connects to other ASICs using the four input/output buffers, one for each neighboring ASIC. An edge ASIC may connect to other edge ASIC to create a secondary connection. For example, ASIC (312) and ASIC (316) connect using the E and W input/output buffers, respectively, and using their respective S input/output buffers. Another possible connection for edge ASICs is a connection to the backplane (207), which connects to other system boards. For example, ASICs (312, 318, 320) connect to the backplane, each using their respective W input/output buffers. Each ASIC may also connect to external memory in the form of static random access memory (SRAM) through a SRAM interface (SRI). For example, ASIC (312) connects to SRAM (314) through SRI (362).

One ASIC on each system board is used as an operative connection to an embedded controller. For example, ASIC (310) uses its S input/output buffer to connect to an embedded controller (304) through a host bridge (308). The embedded controller (304) connects to an Ethernet network (203), associated memory in the form of a synchronous dynamic random access memory (SDRAM) (306), and a high speed switch interface (302). The high speed switch interface (302) connects to the high speed switch (210). The SDRAM (306) may store instructions for the embedded controller (304).

Figure 4:
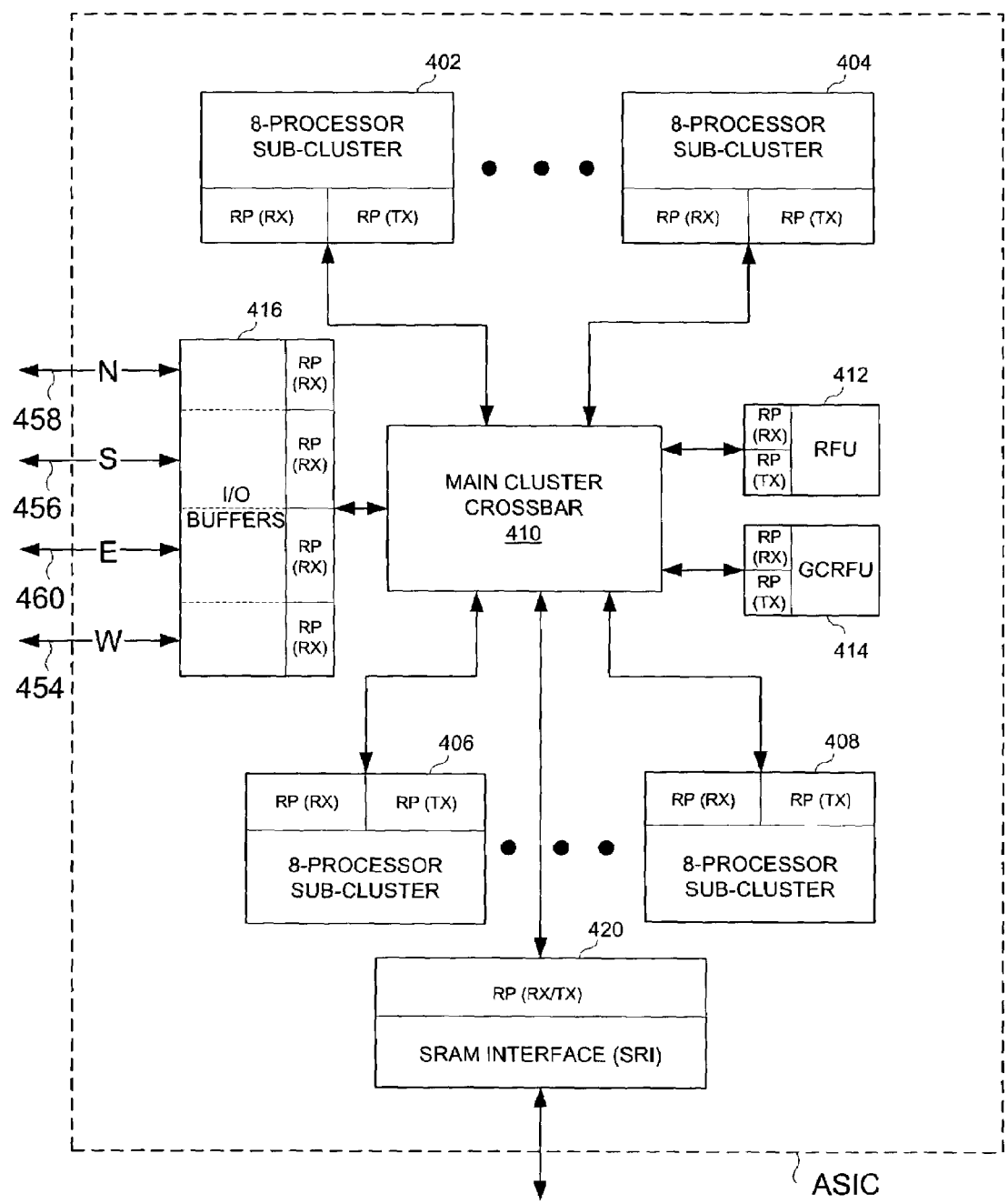
FIG. 4 shows an application specific integrated circuit block diagram in accordance with an embodiment of the present invention.

In accordance with one or more embodiments of the present invention, a block diagram of an ASIC is shown in FIG. 4. The ASIC is representative of any of the ASICs (e.g., ASIC (310, 312, 316, 318, 320)) shown in FIG. 3. A main cluster crossbar (410) connects to multiple terminal points. Each terminal point has at least one statically scheduled routing processor (RP) connected to at least one functional element. The main cluster crossbar (410) enables message passing and communication of information on the ASIC. For example, the main cluster crossbar (410) connects to a statically scheduled routing processor that is associated with each of the input/output buffers (416), such as input/output buffer N (458). Other terminal points include, but are not limited to, additional input/output buffers (456, 460, 454), 8-processor sub-clusters (402, 404, 406, 408) that includes 8 processors connected by a sub-cluster crossbar, a SRI (420), a register file unit (RFU) (412), and a global control register file unit (GCRFU) (414).

In one or more embodiments of the present invention, each input/output buffer is associated with a statically scheduled routing processor that is arranged to receive (RX) information from another input/output buffer on a different ASIC. Alternate connections may include one of the input/output buffers communicating with the embedded controller (304) through the host bridge (308) or one of the input/output buffers connected to the backplane (207), as described previously. The RFU (412) is associated with two statically scheduled routing processors to simultaneously send (TX) and receive (RX) information for temporarily parking messages routed on the main cluster crossbar. The GCRFU (414) is also associated with two statically scheduled routing processors to simultaneously send and receive information for temporarily parking messages routed on the main cluster crossbar and global control information, such as a broadcast tree arbiter to store messages and control functions. The SRI (420) is associated with a single statically scheduled routing processor that both sends and receives information; however, the send or receive operation is not arranged to occur simultaneously. The SRI (420) provides an interface to external memory and may be accessed by the execution processors in the sub-clusters (402, 404, 406, 408) through the main cluster crossbar (410). Each 8-processor sub-cluster (402, 404, 406, 408) is associated with two statically scheduled routing processors, one to receive, and one to send information simultaneously. Each statically scheduled routing processor is associated with a routing table to determine when and where the routing processor should send or receive information. Because the routing is determined a priori, a destination or origination address is not required in the transferred information. However, a tag identification is transferred with the information. The tag identification provides an arrangement to check that the received information occurred during the proper cycle. Each statically scheduled routing processor checks the tag identification to maintain proper operation of the system. Also, to ensure that no bit errors occurred during transmission, each statically scheduled routing processor may have an error correction mechanism to fix a limited number of bit errors.

Figure 5:
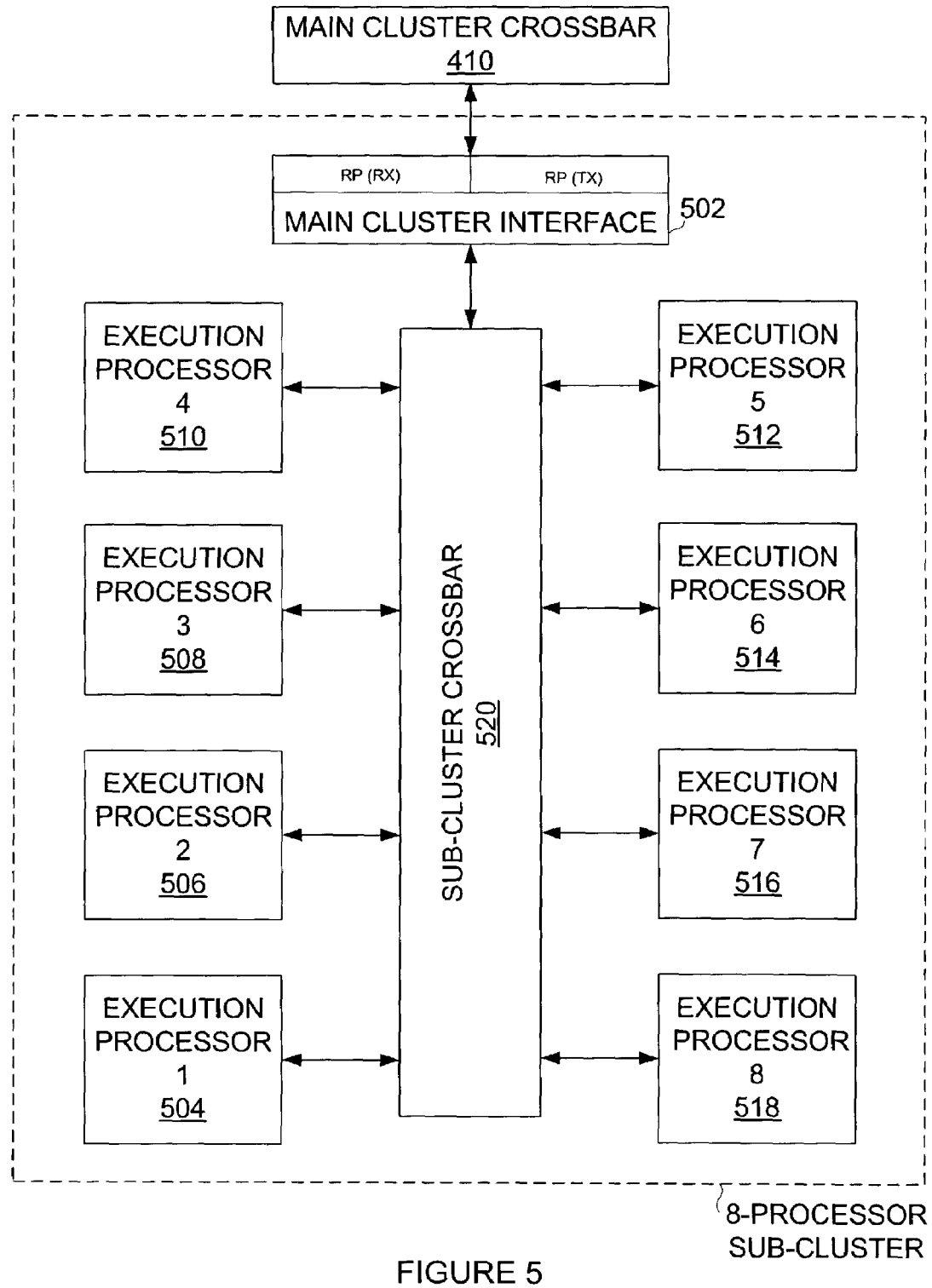
FIG. 5 shows a sub-cluster processor block diagram in accordance with an embodiment of the present invention.

In accordance with one or more embodiments of the present invention, an 8-processor sub-cluster is shown in FIG. 5. The 8-processor sub-cluster is representative of any of the 8-processor sub-cluster (e.g., 8-processor sub-cluster (402, 404, 406, 408)) shown in FIG. 4. The 8-processor sub-cluster has a sub-cluster crossbar (520) that connects to eight execution processors (504, 506, 508, 510, 512, 514, 516, 518) that perform cycle-based computation. The execution processors are capable of executing custom instructions that enable cycle-based computations, such as specific logic operations (e.g., four input, one output Boolean functions), and control instructions, such as a "synchronization" instruction that stalls an execution processor until all execution processors are ready to resume. The sub-cluster crossbar (520) is associated with a main cluster interface (502) that contains two statically scheduled routing processors to send and receive information simultaneously. The main cluster interface (502) transfers information over the main cluster crossbar (410).

The execution processors (504, 506, 508, 510, 512, 514, 516, 518) are capable of executing simulation instructions. Those skilled in the art will appreciate that the execution processors (504, 506, 508, 510, 512, 514, 516, 518) may natively execute a design logic instruction translated from the simulation source code. The simulation source codes include, but are not limited to, RTL designs in Verilog, some other HDL, and high level languages. The execution of instructions on the execution processors (504, 506, 508, 510, 512, 514, 516, 518) is temporally synchronized by a global clock. To maintain coherent transmission of information across multiple execution processors, the execution processors transmit and receive the tag identification along with information.

Figure 6:
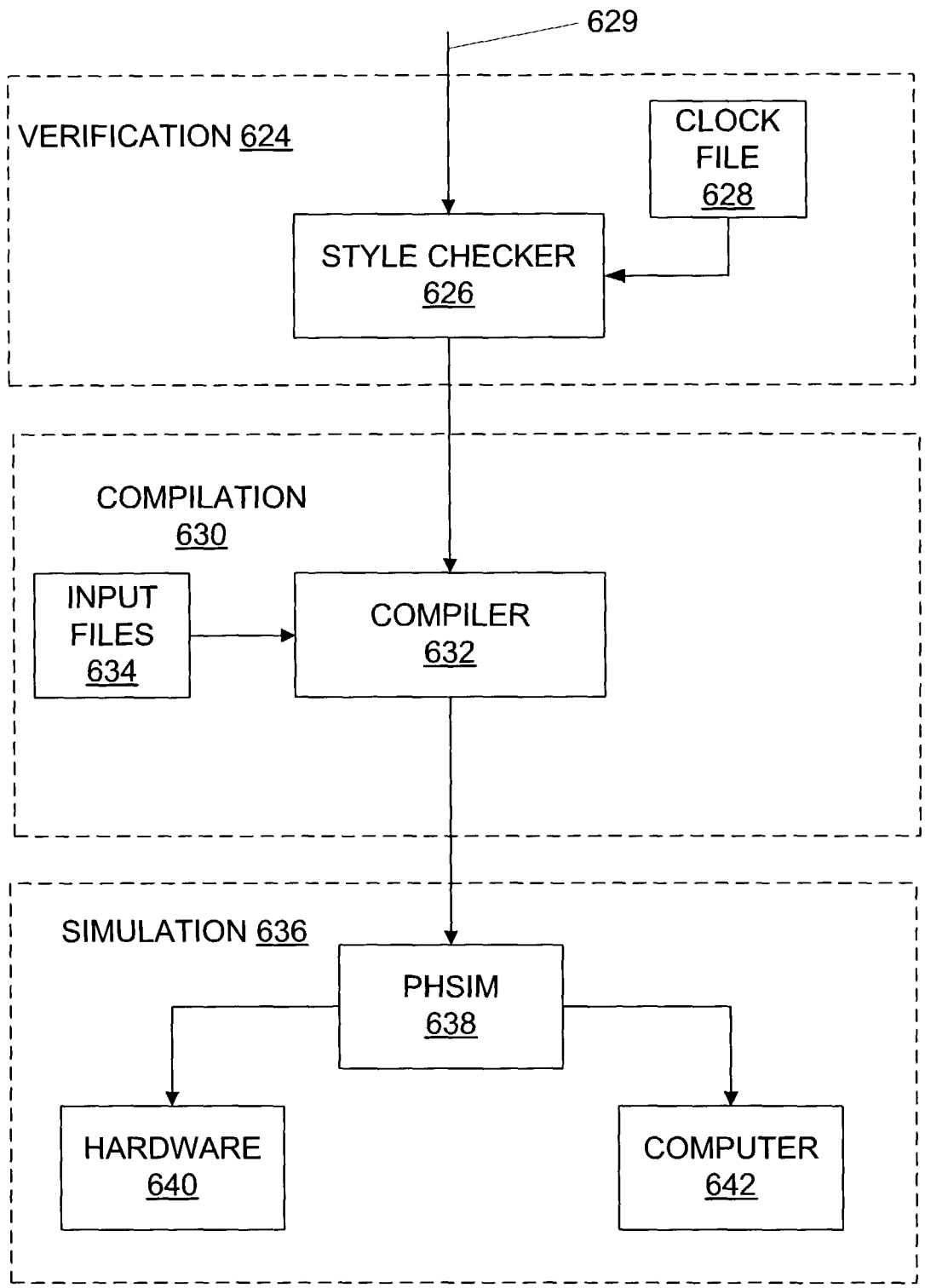
FIG. 6 shows a process of preparing a simulation of a cycle-based logic design to run on a cycle-based system in accordance with an embodiment of the present invention.

In accordance with one or more embodiments of the present invention, FIG. 6 shows a process of preparing a simulation of a cycle-based logic design to run on a cycle-based system, e.g., the Phaser System. The process includes three separate phases. The first phase is a verification phase (624). This phase includes a style checker (626), which parses and checks high level design code of a program (629) representing the cycle-based design. The program is checked for adherence to a cycle-based design standard, e.g., synchronous logic design, no combinatorial logic loops are included, etc. An error action during this phase results from nonconformance to the defined cycle-based design standards. A clock file input (628) defines clocks cycles for the simulation. The output of the verification phase (624) produces a verified cycle-based design.

The second phase is a compilation phase (630), which receives the verified cycle-based design as input from the verification phase (624). The compilation phase (630) uses a translation component, such as a compiler (632), to compile the verified cycle-based design of the verification phase (624). The compiler (632) decomposes the verified cycle-based design into execution processor code that may be executed in parallel on a processor array of the cycle-based system by one or more execution processors. The compiler also produces routing tables and other information, such as routing processor code, interface code, and an annotated symbol table. Routing tables enable static routing of messages sent during run mode segment. An annotation symbol table involves recording physical locations where the values of nets and registers have been stored, so that user interface and Programming Language Interface (PLI) routines may access values of nets and registers during runtime. Input files (634), e.g., PLI and TVI files, etc., provide functionality for items such as system task calls and trace vectors. A user system task call enables a host computer to execute an appropriate portion of a simulation. A trace vector typically contains test input data and expected outputs for testing. Errors in cycle-based designs input into the compiler (632) causes an error action. The compiler and code generation includes a scheme for routing of messages and placement of compiled execution processor code so that there is some optimization in the choice of which of the parallel execution processors of the simulation hardware to use for certain tasks. This is because the time required for delivery of a message from one processor to another depends upon the data connection component between those execution processors, (i.e., the number of hops the message takes in traversing the data connection component from source processor to destination processor). One skilled in the art can appreciate that compilation of a program may be targeted to a specific execution environment and/or platform, e.g., Phaser system hardware or an appropriate computer, such as a SPARC™ workstation produced by Sun Microsystems, Inc. In addition, the scheme for routing messages is also used to route messages from one location in the hardware to another location in the hardware, e.g., transferring data from a RFU on one ASIC to a GCRFU located on another ASIC. In general, the scheme for routing messages allows the cycle-based simulation system to route a message from a source node to a destination node where a node (i.e., the source node, the destination node, and any intermediate nodes connecting the source node and destination node) includes, but is not limited to execution processors, SRAM, RFU, GCRFU, etc The third phase is the simulation phase (636), which receives input in the form of execution processor code from the compilation phase (630). A Phaser simulator driver (638) (PHSIM) typically runs on a host computer and controls and monitors execution of simulations executing on the cycle-based system. The host computer includes such hardware and software mechanisms as are needed to manage simulation, e.g., loading execution processor code onto a processor array. PHSIM (638) enables user interaction with a simulation using a graphical user interface (GUI) or with a command line interface, interactive modification of simulation state, breakpointing, test vector use, system task functionality, signal tracing, single-stepping on clock cycles, and other functionalities. A simulation cycle begins with one or more simultaneous clock edges and completes when every dependent event has completed evaluation. The simulation phase (636) may run on system hardware (640), which is designed for cycle-based computation, or on an appropriate computer, such as a SPARC™ workstation (642) produced by Sun Microsystems, Inc.

Those skilled in the art will appreciate that the computer systems described above are merely exemplary embodiments of the present invention may be implemented on any type of computer system or programming or processing environment.

The present invention involves a routing network system that enables the routing of messages from a source node to a destination node (i.e., nodes connecting the source node and the destination node). The routing network system includes the data connection component, one or more routing tables with one or more routing instructions, and one or more routing processors. The routing table, in accordance with one or more embodiments of the present invention, is a data structure stored as a file on a computer system memory, accessible to the routing processor. The routing network system also includes data stores for storing messages.

A router is used to route messages within a cycle-based system. In one embodiment of the present invention, the router is a process running in the compiler (632 in FIG. 6) of a cycle-based system. The router routes messages at compile time to generate static routing tables to be used by the cycle-based system at runtime. The router maintains information about the state of the cycle-based system (i.e., the location of messages within the cycle-based system) at any given global clock increment during a particular simulation. In one embodiment of the present invention, the global clock increment corresponds to one global clock cycle.

To find a path from a source node to a destination node, the router first generates and initializes a three-dimensional maze data structure. Two dimensions represent a spatial relationship between all the nodes in the three-dimensional maze data structure. A third dimension defines a temporal relationship between each node and each global clock increment or range of global clock increments. Thus, the data structure may be viewed as a three dimensional maze made up of cells, where each cell contains information regarding the status of the node (i.e., the node is occupied, etc.) at a particular global clock increment or range of global clock increments. In one embodiment of the invention, to route a message from a source node to a destination node, the router receives a message at a particular cell associated with the source node and attempts to find a path from a cell corresponding to the source node to a cell corresponding to the destination node using depth-first search. The router searches for a path using a modified form of depth-first search where the path is constrained to flow forward in time. For example, for the router to move the message from a first cell to a second cell, the second cell must correspond to a higher global clock increment or range of global clock increments than the first cell.

Figure 7:
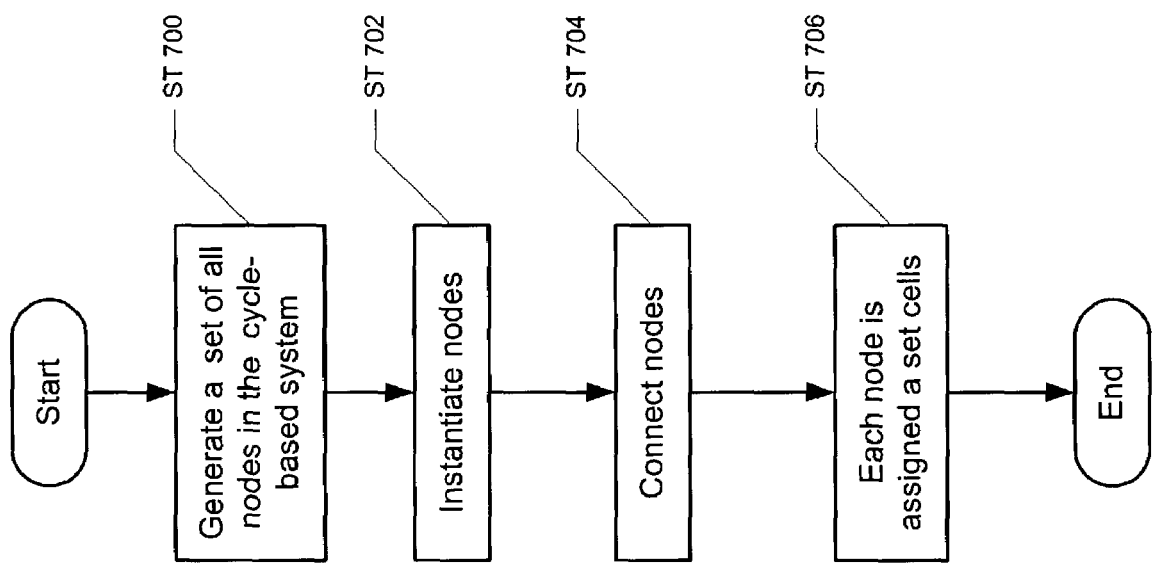
FIG. 7 shows a method to initialize the data structures used to route a message in accordance with one embodiment of the present invention.

FIG. 7 shows a method to initialize the data structures within a cycle-based system used to route a message in accordance with one embodiment of the present invention. Initially, the router generates a set of all nodes within the cycle-based system (Step 700). The router then gathers information about the number of system boards in the cycle-based system and the number and arrangement of ASICs on each system board. The router may obtain this information from a "connectivity file." The connectivity file includes information about how each component in the cycle-based system is connected, e.g., how a particular ASIC is located on a specific system board, etc. Alternatively, the router may obtain the information from a file containing default values.

Returning to FIG. 7, the router, using the information obtained in Step 700, instantiates the nodes (Step 702). In one embodiment of the present invention, the router initializes a root node (e.g., a top level node such as an ASIC) that subsequently generates child nodes (e.g., an RFU located on the ASIC). For example, the router may initialize a single ASIC as a root node, and the root node (i.e., the ASIC) subsequently instantiates the execution processors located on the ASIC.

Once all the nodes have been instantiated, the router proceeds to connect the nodes (Step 704). In one embodiment of the present invention, the router makes those connections that are contained entirely within individual ASICs. The router then proceeds to connect individual ASICs together. The individual ASICs may be connected via I/O buffers (e.g., W (454), S (456), N (458), and E (460) in FIG. 4). The router may use connectivity information stored in a file to connect the nodes. In one or more embodiments of the present invention, the router assumes that the ASICs are arranged along a Cartesian grid and makes connections between nodes accordingly.

Returning to FIG. 7, once all the nodes are connected each node is assigned a set of cells. Each cell denotes the status of the node (i.e., there is a message at the node, there is not a message at the node, etc) at a particular time or a time range (706). The times are based on a global clock of the cycle-based system. Further, each cell may also include other information about the node at the particular time or range of times such as which message is occupying the node, etc. Each set of cells may be associated with a node via a data structure. In one embodiment of the invention, the data structure is a doubly-linked list of cells, maintained in strict order of the global clock. In this case, the doubly linked list may initially be empty and cells only added to the doubly linked list associated with the node when a message is occupying the node (i.e., no cells are associated with the node at times when the node is not occupied). Thus, when the node is not occupied by a message, a cell is not required to indicate this. Alternatively, each set of cells may be associated with a node by an array. Thus, the nodes represent the physical locations of the hardware (e.g., RFU, GCRFU, SRAM, etc) within the cycle-based system and the cells associated with each node correspond to the availability or use of the node at a particular global clock increment or range of global clock increments.

In one or more embodiments of the present invention, a single message is a thirty-two bit quantity, introduced at a specific node (i.e., a source node) in the cycle-based system at a specific global clock increment (i.e., a start time) to be routed to another specific node (i.e., a destination node). Generally, the router is only constrained by the start time and no determination is made to as when the message must reach the destination node. An arrival clock (i.e., when the message reaches the destination node) is determined by the path the message takes to reach the destination node. The arrival clock value may be sent back to the source node. Alternatively, the router may be instructed by the source node not to let the message arrive before a particular arrival clock value. For example, the destination node may be busy before that arrival clock value.

In one or more embodiments of the present invention, each message has a unique message identification number. The message identification number may be assigned by a process outside the router. The unique message identification number is used by the router to distinguish logically distinct messages that are present in the system at the same time, and to track each message as the message finds a path from the source node to the destination node.

Figure 8:
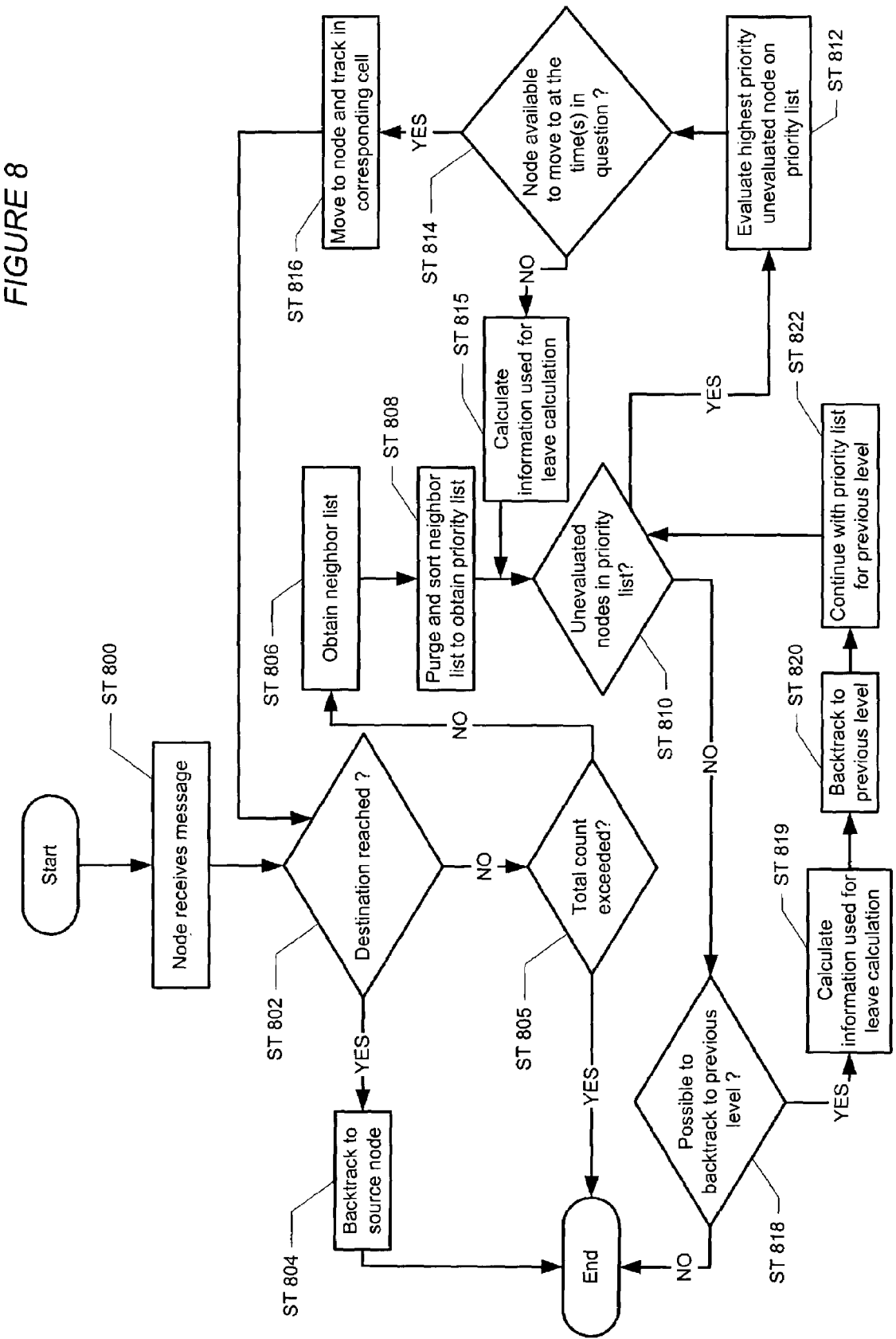
FIG. 8 shows a flow chart describing a method to route a message in accordance with one embodiment of the present invention.

FIG. 8 shows a flow chart describing a method to route a message in accordance with one embodiment of the present invention. The method uses a modified version of depth first search. Initially, a node receives a message that may need to be routed (i.e., the node may be the destination of the message but this is not checked until later in the method) (Step 800). The router then determines if the node is the destination of the message (Step 802). If the node is the destination of the message, then the router (via recursion) backtracks in the depth first search recursion tree to the source node (Step 804). During the backtracking in the depth first recursion tree, the router records in the data structure representing the maze, information that will be used to generate a route table entry. For example, the router may record each node the message will pass through while being routed from the source node to the destination node. Further, the router may record the global clock increment or global clock increment range that the message occupies for each node while moving from the source node to the destination node.

If the node is not the destination node (Step 802), then the router proceeds to determine if a total count has been exceeded (Step 805). Those skilled in the art will appreciate that the router may potentially spend significant amounts of time attempting to route one message. As the number of messages increases in the system, the time to find a route for a particular message typically increases. This increase in router usage, which typically corresponds to processor time, may potentially slow down the router and the overall process of generating the static routing table. As such, in one or more embodiments of the present invention, each message is allowed a certain number of cells to search to attempt to find a path to the destination node. Each time a cell is searched by the router to route a particular message counts against the total count. If a route to the destination node is not found before the total count is exceeded, then the router halts the search. At this point, the router attempts to try a different method to route the message (not shown in FIG. 8). Details regarding additional attempts to route the message using a different method are discussed below.

If the attempt to route the message has not exceeded the total count (Step 805), the router proceeds to obtain a neighbor list (Step 806). The neighbor list is a list of nodes that the message may move to directly from the current node. In one embodiment of the present invention, the neighbor list is generated during the initialization of the data structures used in routing (refer to FIG. 7) and copied as needed for subsequent use by the router. After obtaining the neighbor list, the router proceeds to purge the neighbor list using a first set of heuristics, and sort the non-purged members of the neighbors using a second set of heuristics to obtain a priority list (Step 808). The priority list is typically a subset of the neighbor list that indicates, in order of priority, which of the neighbors of the node should be evaluated to determine if a route exists to the destination node. The first set of heuristics and second set of heuristics also include mechanisms to efficiently purge and sort the neighbor list.

The first set of heuristics may include one or more of the following. One heuristic does not allow a message to park in a node that connects two ASICs. Thus, if parking is allowed and required for the message to proceed down a given route, then a node that connects two ASICs are purged from the neighbor list based on this heuristic. Another heuristic does not allow a message to move from node to node within one ASIC in the event that ASIC to ASIC progress is not proceeding. In this case, the message is routed to a node, within the ASIC, that allows parking and waiting until ASIC to ASIC progress can be made. Another heuristic does not permit the router to explore routes that obviously do not lead in the direction of the destination node. For example, if the destination node lies on a different ASIC than the source node, only consider routes that lead off the present ASIC.

As mentioned above, a node may be an execution processor, SRAM, RFU, GCRFU, etc. RFU and GCRFU are typically used to park messages. The term parking, within the context of the present invention, is used to denote that a particular message may stay in a node for a period of time (i.e., the message fills multiple cells for a given node). In one embodiment of the present invention, parking of messages may be restricted by a variety of ways, e.g., the message may not park in any node that interconnects ASIC chips, messages may only park in a regfile (i.e., RFU (412), GCRFU (414) in FIG. 4), the message may only park at the origin of the message (i.e., the router may decide not to accept the message until a particular global clock increment), etc. The details for parking the message in a regfile are provided below. While the amount of time that the message may be parked at a particular node may be arbitrarily set, those skilled in the art will appreciate that the upper limit is constrained by the total number of global clock cycles in the simulation, i.e., the message may not be parked at a particular node for longer than the duration of the simulation.

Returning to FIG. 8, in the event that parking is not enabled, the router will purge any nodes on the neighbor list that correspond to RFU and GCRFU. However, if parking is enabled then the nodes corresponding to RFU and GCRFU will be evaluated using the first set of heuristics described above.

The second set of heuristics may include one or more of the following. One heuristic determines the shortest path to the destination node. An auxiliary router array stores the distance between every pair of ASICs in the cycle-based system. From these data, a router may learn which of many potential paths leads most directly to the destination node and sort the list of neighbors to prefer those paths. Thus, this heuristic operates such that in an empty maze, the first path the router chooses leads as quickly as possible to the destination. Another heuristic does not allow the router to consider any non-minimal paths. Thus, the router only routes the message down the paths that are of minimal distance. Minimal paths may be found using the auxiliary router array described above. Another heuristic allows the router to sort the non-purged neighbors according to priority, where priority is assigned on the relative closeness of the neighbor to the destination. If there are multiple nodes that the message may move to, then in one or more embodiments of the invention, prioritize the nodes according to the number of paths exiting each of the nodes in question. Further, as a result of sorting the neighbor list using the second set of heuristics, parking, when enabled, may not take place until all non-parking nodes (i.e., nodes where the message cannot park) on the priority list have been searched. This occurs as parking does not bring the message any closer to the destination node, thus the nodes where the message may park are the lowest priority nodes in the priority list.

Returning to FIG. 8, the router then determines if there are any unevaluated nodes in the priority list (Step 810). The check is performed to determine if the router should continue to attempt to route the message from the node or if the router should backtrack to the previous level (i.e., the previous node from which the message moved from) and attempt to find another route using the previous node and the priority list corresponding to the previous node. If there are unevaluated nodes in the priority list (Step 810) then the router proceeds to evaluate the highest priority unevaluated node in the priority list (Step 812).

The router initially determines if the node is unoccupied at the global clock increment or range of global clock increments for which the message would occupy the node. The router typically looks at the cells associated with the node in question to determine if the node is unoccupied at that global clock increment or range of global clock increments. If the node is occupied during the global clock increment or range of global clock increments for which the message would like to occupy the node, then the router determines if the message occupying the node is the same as the message currently being routed. Typically, the router compares the message identification number of the message occupying the node at the global clock increment or range of global clock increments in question, with the message identification number of the message currently being routed. If the message identification numbers are the same, the message currently being routed may also occupy the node at that global clock increment or range of global clock increments. If the message identification numbers are not the same, then the message currently being routed may not enter the node at the global clock increment or range of global clock increments in question.

If the node is unoccupied or contains a message with the same message identification number as the message occupying the node at the global clock increment or range of global clock increments in question, then the router proceeds to determine if the router, while attempting to route the current message, has ever reached this node and attempted to route the message during the global clock increment or range of global clock increments in question. Information about previous attempts to route the message is recorded by the router, in a data structure associated with the node. If the router has reached this node previously and attempted and failed to route a message during the global clock increment or range of global clock increments in question, then the router does not allow the message to be moved to the node. However, if the node contains no such information then the router moves the message to the node.

Determining when the message would like to occupy a given node is analogous to determining when the message can leave the current node. If parking is not allowed, then the message must leave after an internal delay at the node, where the internal duration is typically fixed and determined by the hardware of the node.

If parking is allowed, the router determines the earliest time at which the message may leave the current node (i.e., the router performs the "leave calculation"). In one or more embodiments of the invention, information returned to the current level of recursion by backtracking up the recursion tree (Steps 815 and Step 819) may be used to determine when the message should leave the current node. If no such information is available, the router may have to backtrack to the current node many times, in effect determining by trial and error when the message may leave the current node. Those skilled in the art will appreciate that using information returned by backtracking, may substantially improve the speed of operation of the router.

Returning to FIG. 8, if the node is available to move to at the global clock increment or range of global clock increments in question (Step 814) as described above, then the message is moved to the node and the corresponding cell for the global clock increment or range of global clock increments in question is created. If the cell already exists, then cell is updated to reflect that the message will occupy the node at the global clock increment or range of global clock increments in question (Step 816).

If the node is not available to move to, then the router returns to Step 810 (via Step 815 as described above) and attempts to evaluate the next highest priority node, if one exists, in the neighbor list. If, at the node in question, there are no remaining unevaluated nodes in the priority list (Step 810), then the router determines if it is possible to backtrack to the previous level (Step 818). Those skilled in the art will appreciate that the determination occurs implicitly as part of the recursion process. However, the determination is explicitly shown to provide a complete description of the present invention. If it is not possible to backtrack to the previous level (i.e., the node in question is the source node and all nodes in the priority list have been evaluated with no route found to the destination), then the router exits. If the router can backtrack to the previous level, the router calculates information used for the leave calculation (Step 819), recurses up to the previous level (Step 820), and subsequently continues with the previously obtained priority list for the previous level (Step 822). The router then proceeds to Step 810. In this manner, the router performs a depth first search to attempt to route the message from the source node to the destination node.

As noted in FIG. 8, a message may park in a regfile (i.e., RFU (412) and GCRFU (414) in FIG. 4). In one embodiment of the present invention, each regfile may have 64 message-sized registers for use as parking spaces for messages temporarily unable to make progress. The router knows the logical identity (i.e., the message identification number) of the messages in regfile, and decides which registers are used for which messages.

The routing software uses the regfiles efficiently as each regfile has limited space. As noted, above there maybe 64 registers per regfile, and two regfiles (i.e., RFU (412) and GCRFU (414) in FIG. 4) per ASIC; thus, there may be 8192 registers on one system board (220 in FIG. 2) having 64 chips. However, in a typical cycle-based simulation, hundreds of thousands of messages may flow through one system board.

In one embodiment of the present invention, a regfile may accept and emit one message on each global clock increment. During each global clock increment, each ASIC may have messages entering from as many as thirteen non-regfile sources, i.e., eight sub-clusters (402–408 in FIG. 4), four IO ports (454-460 in FIG. 4), and one SRAM (314 in FIG. 3). Thus, in this embodiment, at most two messages may be "captured" by the ASIC's two regfiles in each global clock increment.

In one embodiment of the present invention, each representation of the regfile in software has special instance variables to facilitate the efficient usage of each regfile. Specifically, several arrays track what happens to the register at different global clock values, and an array of lists of pointers tracks loads and stores for each register in the regfile.

In one embodiment of the present invention, the regfiles use shadow loading as a method to efficiently use the regfiles. A load into a regfile is said to be "shadowed" when a load at an earlier global clock value renders the load unnecessary. For example, suppose the router loads one instance of message 47 into register 3 of regfile 19 at global clock value 251. Suppose the router later extends the use of register 3 by loading another instance of message 47 at an earlier global clock value, e.g., global clock value 223, and letting message 47 sit there at least through global clock value 251. Because of the load at global clock value 223, the load at global clock value 251 is no longer necessary. The load of message 47 at global clock value 251 is shadowed by the load of message 47 at global clock value 223. During the global clock value when the shadowed load would have occurred, the regfile may instead load a different message. The implementation of shadow loading increases the availability of the regfile, thereby decreasing potential routing bottlenecks.

As noted above, if a message has not reached the destination or has exceed the total count, then the router may try a different method to attempt to route the message. The method described in FIG. 8 allows the router to enable or disable parking in an attempt to route the message. The method, described in FIG. 8, is provided with a particular start time when the message is received and uses the particular start time as a starting point to route the message. The start time, i.e., the starting global clock value, may be varied if the start time provided initially does not yield a route from the source node to the destination node.

The start time is varied by extending a send interval for a message. A processor (e.g., execution processor 4 (510) in FIG. 5) issues a send instruction at a global clock value when the router is able to immediately accept the message, and when the processor's output latch does not already contain that message. The global clock value starts the send interval in question. The send interval continues as long as the router continues to read the latched message during each successive global clock increment, and the send interval ends with the last such consecutive use of the message by the processor. A send interval for a particular processor and message is defined to be a maximal sequence of adjacent global clock increments during each of which that same message is read from the processor's output latch. Each send interval begins with a send instruction. When the send interval is over, then the processor may send a different message immediately thereafter. Those skilled in the art will appreciate that this embodiment impacts the efficiency of processor operation by minimizing the number of the send instructions required to route all instances of a particular message from a particular processor.

In one embodiment of the present invention, the start time is changed by the routing software, and the software generating instructions for the source processor is subsequently advised as to when to generate the send instruction that begins the send interval. For example, assume that message 47 first became available at global clock value 10 and no route is found to the destination node. The router may decide then not to accept the message until global clock value 15, and try to route the message using global clock value 15 as the start time. Those skilled in the art will appreciate that enabling/disabling parking and varying the start time may be used in any combination without affecting the scope of the claims.

In certain instances, the cycle-based simulation may wish to send one message from a single source node to multiple destination nodes. In one embodiment of the present invention, the router obtains a list of destination nodes, and then proceeds to prioritize the order in which the messages are routed to the multiple destination nodes defined by the list of destinations. Messages that have destination nodes that are on a different ASIC than the source node are routed first, followed by messages that have destinations node on the same ASIC as the source node but are not in the same sub-cluster as the source node, followed by messages that have a destination node and source node in the same sub-cluster as the source node. Those skilled in the art will appreciate that messages which have a long distance to travel may be more difficult to route, hence this prioritization allows those messages the first opportunity to obtain the use of the router resources.

The present invention may have some of the following advantages. The present invention provides for the conservation of bandwidth on the data connection component and conservation of computing resources on the processor array by enhancing message routing and execution processor assignment. The present invention allows static routing of messages enabling a cycle-based system to efficiently simulate large circuit designs on a single system.

While the present invention has been described with respect to a limited number of embodiments, those skilled in the art, having benefit of this disclosure, will appreciate that other embodiments can be devised which do not depart from the scope of the present invention as disclosed herein. Accordingly, the scope of the present invention should be limited only by the attached claims.

What is claimed is:

1. A method for routing a message from a source node to a destination node, wherein the source node and the destination node are connected by a plurality of nodes in a cycle-based system, comprising:
    generating a maze data structure comprising the plurality of nodes, wherein each of the plurality of nodes is associated with a dimension corresponding to time; and
    routing the message from the source node to the destination node using the dimension corresponding to time, wherein routing the message comprises:
        obtaining a neighbor list for a current node if routing the message can proceed from the current node, wherein the current node is one of the plurality of nodes;
        analyzing the neighbor list to obtain a prioritized list;
        determining whether the message can move to a highest priority unevaluated node on the prioritized list,
            wherein determining whether the message can move uses the dimension corresponding to time associated with the current node and the dimension corresponding to time associated with the highest priority unevaluated node, and
            wherein determining whether the message can move to the highest priority unevaluated node on the prioritized list comprises determining whether the highest priority unevaluated node is occupied at a time when the message is attempting to enter the highest priority unevaluated node; and
        saving static routing information if the current node is the destination node.

2. The method of claim 1, wherein routing comprises employing a depth first search and constraining a path from the source node to the destination node to flow forward in time.

3. The method of claim 1, wherein generating the maze structure comprises:
    generating a list of the plurality of nodes in the cycle-based system;
    instantiating each of the plurality of nodes using the list;
    connecting each of the plurality of nodes to at least one other node in the plurality of nodes; and
    assigning a plurality of cells to each of the plurality of nodes, wherein the plurality of cells correspond to the dimension corresponding to time.

4. The method of claim 3, wherein each of the plurality of cells corresponds to at least one of the group consisting of a global clock increment and a range of global clock increments.

5. The method of claim 3, wherein each of the plurality of nodes is from at least one of the group consisting of a register file unit, a static random access memory, an IO port, a main cluster interface, and an execution processor.

6. The method of claim 3, wherein each of the plurality of cells is assigned to one of the plurality of nodes using a doubly-linked list.

7. The method of claim 6, wherein the doubly-linked list is maintained in increasing order of global clock increments.

8. The method of claim 3, wherein a connection between the plurality of nodes to at least one other node in the plurality of nodes corresponds to a physical connection in the cycle-based system.

9. The method of claim 1, further comprising:
    enabling the message to park on at least one of plurality of nodes.

10. The method of claim 9, wherein the message is parked in a register file unit.

11. The method of claim 10, wherein the register file unit uses shadow loading.

12. The method of claim 1, further comprising:
    varying a current start time of the message to a new start time of the message.

13. The method of claim 12, wherein the new start time of the message is greater than the current start time of the message.

14. The method of claim 1, wherein determining whether routing the message can proceed from the current node comprises determining whether the current node is the destination node.

15. The method of claim 1, wherein determining whether routing the message can proceed from the current node comprises determining whether a total count is exceeded.

16. The method of claim 1, wherein analyzing the neighbor list comprises:
    purging the neighbor list using a first set of heuristics to create a purged neighbor list; and
    sorting the purged neighbor list using a second set of heuristics to obtain the prioritized list.

17. The method of claim 16, wherein the first set of heuristics comprises:
    preventing the message from parking in one of the plurality of nodes if the one of the plurality of nodes connects a first ASIC and a second ASIC.

18. The method of claim 16, wherein the first set of heuristics comprises:
    preventing the message from repeatedly moving through at least two of a plurality of nodes if the message is blocked from moving from a first ASIC to a second ASIC.

19. The method of claim 16, wherein the second set of heuristics comprises:
    sorting the plurality of nodes in the purged neighbor list according to a minimal distance from the destination node.

20. The method of claim 16, wherein the second set of heuristics comprises:
    sorting the plurality of nodes in the purged neighbor list according to a potential path number for each of the plurality of nodes, wherein the potential path number is determined using the neighbor list for each of the plurality of nodes.

21. The method of claim 1, wherein determining whether the message can move to the highest priority unevaluated node on the prioritized list comprises:
    determining whether the highest priority unevaluated node is occupied at a time when the message is attempting to enter the highest priority unevaluated node and whether an occupying message has a message identification number that is the same as a message identification number of the message.

22. The method of claim 1, wherein the message is moved to the highest priority unevaluated node if the highest priority unevaluated node is unoccupied at a time when the message is attempting to enter the highest priority unevaluated node.

23. The method of claim 1, wherein the message is moved to the highest priority unevaluated node if the highest priority unevaluated node is occupied at a time when the message is attempting to enter the highest priority unevaluated node by an occupying message that has a message identification number that is the same as a message identification number of the message.

24. The method of claim 1, wherein determining whether the message can move to the highest priority unevaluated node on the prioritized list comprises determining when the message can leave the current node.

25. The method of claim 24, wherein determining when the message can leave comprises:
   determining a first global clock increment for a first time the message may be accepted by any node in the prioritized list;
   determining a second global clock increment using an internal delay of the current node and a current global clock increment; and
   obtaining the leave time by determining a maximum value between the first global clock increment and the second global clock increment.

26. A method for routing a message from a source node to a destination node, wherein the source node and the destination node are connected by a plurality of nodes in a cycle-based system, comprising:
   obtaining a neighbor list for a current node if routing the message can proceed from the current node, wherein the current node is one of the plurality of nodes;
   analyzing the neighbor list to obtain a prioritized list;
   determining whether the message can move to a highest priority unevaluated node on the prioritized list,
      wherein determining whether the message can move uses the dimension corresponding to time associated with the current node and the dimension corresponding to time associated with the highest priority unevaluated node, and
      wherein determining whether the message can move to the highest priority unevaluated node on the prioritized list comprises determining whether the highest priority unevaluated node is occupied at a time when the message is attempting to enter the highest priority unevaluated node; and
   saving static routing information if the current node is the destination node.

27. The method of claim 26, further comprising:
   initializing the plurality of nodes, wherein initializing the plurality of nodes comprises:
      generating a list of the plurality of nodes in the cycle-based system;
      instantiating each of the plurality of nodes using the list;
      connecting each of the plurality of nodes to at least one other node in the plurality of nodes; and
      assigning a plurality of cells to each of the plurality of nodes.

28. The method of claim 27, wherein a connection between the plurality of nodes to at least one other node in the plurality of nodes corresponds to a physical connection in the cycle-based system.

29. The method of claim 26, further comprising:
   enabling the message to park on at least one of plurality of nodes.

30. The method of claim 26, further comprising:
   varying a current start time of the message to a new start time of the message.

31. The method of claim 26, wherein determining whether routing the message can proceed from the current node comprises determining whether the current node is the destination node.

32. The method of claim 26, wherein determining whether routing the message can proceed from the current node comprises determining whether a total count is exceeded.

33. The method of claim 26, wherein analyzing the neighbor list comprises:
   purging the neighbor list using a first set of heuristics to create a purged neighbor list; and
   sorting the purged neighbor list using a second set of heuristics to obtain the prioritized list.

34. A method for routing a message from a source node to a plurality of destination nodes, wherein the source node and each of the plurality of destination nodes are connected by a plurality of nodes in a cycle-based system, comprising:
   prioritizing each of the plurality of destination nodes to create a priority list, wherein prioritizing comprises sorting each of the plurality of destination nodes according to distance from the source node; and
   routing the message to each of the plurality of destination nodes using the priority list, wherein routing comprises:
      obtaining a neighbor list for a current node if routing the message can proceed from the current node, wherein the current node is one of the plurality of nodes,
      analyzing the neighbor list to obtain a prioritized list,
      determining whether the message can move to a highest priority unevaluated node on the prioritized list,
         wherein determining whether the message can move uses the dimension corresponding to time associated with the current node and the dimension corresponding to time associated with the highest priority unevaluated node, and
         wherein determining whether the message can move to the highest priority unevaluated node on the prioritized list comprises determining whether the highest priority unevaluated node is occupied at a time when the message is attempting to enter the highest priority unevaluated node; and
      saving static routing information, if the current node is the destination node.

35. A computer-readable medium having recorded thereon instructions executable by a processor, the instructions for routing a message from a source node to a destination node, wherein the source node and the destination node are connected by a plurality of nodes in a cycle-based system, the instructions comprising:
   instructions for obtaining a neighbor list for a current node if routing the message can proceed from the current node, wherein the current node is one of the plurality of nodes;
   instructions for analyzing the neighbor list to obtain a prioritized list;

instructions for determining whether the message can move to a highest priority unevaluated node on the prioritized list,
   wherein determining whether the message can move uses the dimension corresponding to time associated with the current node and the dimension corresponding to time associated with the highest priority unevaluated node, and
   wherein determining whether the message can move to the highest priority unevaluated node on the prioritized list comprises determining whether the highest priority unevaluated node is occupied at a time when the message is attempting to enter the highest priority unevaluated node; and
instructions for saving static routing information, if the current node is the destination node.

36. The computer-readable medium of claim 35, the instructions further comprising:
   instructions for initializing the plurality of nodes, wherein initializing the plurality of nodes comprises:
      generating a list of the plurality of nodes in the cycle-based system;
      instantiating each of the plurality of nodes using the list;
      connecting each of the plurality of nodes to at least one other node in the plurality of nodes; and
      assigning a plurality of cells to each of the plurality of nodes.

37. A computer-readable medium having recorded thereon instructions executable by a processor, the instructions for routing a message from a source node to a plurality of destination nodes, wherein the source node and each of the plurality of destination nodes are connected by a plurality of nodes, the instructions comprising:
   instructions for prioritizing each of the plurality of destination nodes to create a priority list, wherein prioritizing comprises sorting each of the plurality of destination nodes according to distance from the source node; and
   instructions for routing the message to each of the plurality of destination nodes using the priority list, wherein routing comprises:
      obtaining a neighbor list for a current node if routing the message can proceed from the current node, wherein the current node is one of the plurality of nodes,
      analyzing the neighbor list to obtain a prioritized list,
      determining whether the message can move to a highest priority unevaluated node on the prioritized list,
         wherein determining whether the message can move uses the dimension corresponding to time associated with the current node and the dimension corresponding to time associated with the highest priority unevaluated node, and
         wherein determining whether the message can move to the highest priority unevaluated node on the nrioritized list comprises determinmnn whether the highest priority unevaluated node is occupied at a time when the message is attempting to enter the highest priority unevaluated node; and
      saving static routing information, if the current node is the destination node.

38. The computer-readable medium of claim 37, the instructions further comprising:
   instructions for initializing the plurality of nodes, wherein initializing the plurality of nodes comprises:
      generating a list of the plurality of nodes in the cycle-based system;
      instantiating each of the plurality of nodes using the list;
      connecting each of the plurality of nodes to at least one other node in the plurality of nodes; and
      assigning a plurality of cells to each of the plurality of nodes.

39. A cycle-based system, comprising:
   a plurality of nodes;
   an execution processor for generating a message to route; and
   a router for routing the message from a source node to a destination node,
   wherein the source node and the destination node are connected by the plurality of nodes,
   wherein the routing of the message comprises instructions for:
      obtaining a neighbor list for a current node if routing the message can proceed from the current node, wherein the current node is one of the plurality of nodes,
      analyzing the neighbor list to obtain a prioritized list,
      determining whether the message can move to a highest priority unevaluated node on the prioritized list,
         wherein determining whether the message can move uses the dimension corresponding to time associated with the current node and the dimension corresponding to time associated with the highest priority unevaluated node, and
         wherein determining whether the message can move to the highest priority unevaluated node on the prioritized list comprises determining whether the highest priority unevaluated node is occupied at a time when the message is attempting to enter the highest priority unevaluated node; and
      saving static routing information, if the current node is the destination node.

40. The cycle-based system of claim 39, further comprising instructions for:
   initializing the plurality of nodes, wherein initializing the plurality of nodes comprises:
      generating a list of the plurality of nodes in the cycle-based system;
      instantiating each of the plurality of nodes using the list;
      connecting each of the plurality of nodes to at least one other node in the plurality of nodes; and
      assigning a plurality of cells to each of the plurality of nodes.

41. The cycle-based system of claim 40, wherein a connection between the plurality of nodes to at least one other node in the plurality of nodes corresponds to a physical connection in the cycle-based system.

42. The cycle-based system of claim 39, wherein the message is enabled to park on at least one of plurality of nodes.

43. The cycle-based system of claim 39, wherein determining whether routing the message can proceed from the current node comprises determining whether the current node is the destination node.

44. The cycle-based system of claim 39, wherein determining whether routing the message can proceed from the current node comprises determining whether a total count is exceeded.

45. The cycle-based system of claim 39, wherein analyzing the neighbor list comprises:

purging the neighbor list using a first set of heuristics to create a purged neighbor list; and sorting the purged neighbor list using a second set of heuristics to obtain the prioritized list.

46. An apparatus for routing a message from a source node to a destination node, wherein the source node and the destination node are connected by a plurality of nodes in a cycle-based system, comprising:

means for generating a maze data structure comprising the plurality of nodes, wherein each of the plurality of nodes is associated with a dimension corresponding to time; and means for routing the message from the source node to the destination node using the dimension corresponding to time means for obtaining a neighbor list for a current node if routing the message can proceed from the current node, wherein the current node is one of the plurality of nodes;

means for analyzing the neighbor list to obtain a prioritized list:

means for determining whether the message can move to a highest priority unevaluated node on the prioritized list, wherein determining whether the message can move uses the dimension corresponding to time associated with the current node and the dimension corresponding to time associated with the highest priority unevaluated node, and wherein determining whether the message can move to the highest priority unevaluated node on the prioritized list comprises determining whether the highest priority unevaluated node is occupied at a time when the message is attempting to enter the highest priority unevaluated node; and means for saving static routing information, if the current node is the destination node.

47. An apparatus for routing a message from a source node to a plurality of destination nodes, wherein the source node and each of the plurality of destination nodes are connected by a plurality of nodes in a cycle-based system, comprising:

means for prioritizing each of the plurality of destination nodes to create a priority list, wherein prioritizing comprises sorting each of the plurality of destination nodes according to distance from the source node; and means for routing the message to each of the plurality of destination nodes using the priority list, wherein routing comprises:

obtaining a neighbor list for a current node if routing the message can proceed from the current node, wherein the current node is one of the plurality of nodes;

analyzing the neighbor list to obtain a prioritized list;

determining whether the message can move to a highest priority unevaluated node on the prioritized list; and wherein determining whether the message can move uses the dimension corresponding to time associated with the current node and the dimension corresponding to time associated with the highest priority unevaluated node, and wherein determining whether the message can move to the highest priority unevaluated node on the prioritized list comprises determining whether the highest priority unevaluated node is occupied at a time when the message is attempting to enter the highest priority unevaluated node; and means for saving static routing information, if the current node is the destination node.

* * * * *

UNITED STATES PATENT AND TRADEMARK OFFICE
CERTIFICATE OF CORRECTION

PATENT NO.        : 7,224,689 B2                                       Page 1 of 1
APPLICATION NO. : 10/197451
DATED             : May 29, 2007
INVENTOR(S)       : Jay R. Freeman It is certified that error appears in the above-identified patent and that said Letters Patent is hereby corrected as shown below:

Column 21, line 58, the words "nrioritized" and "determinmnn" should be --prioritized-- and --determining--.

Column 24, line 33, "; and" should be replaced with a --,--.

Signed and Sealed this

Twenty-eighth Day of August, 2007

JON W. DUDAS
*Director of the United States Patent and Trademark Office*